(12) United States Patent
Weber et al.

(10) Patent No.: US 9,334,912 B2
(45) Date of Patent: May 10, 2016

(54) FUNCTIONAL UNIT FOR ADJUSTING A BRAKE PAD OF A DISC BRAKE

(71) Applicant: KNORR-BREMSE Systeme fuer Nutzfahrzeuge GmbH, Munich (DE)

(72) Inventors: Ralf Weber, Munich (DE); Matthias Klingner, Moorenweis (DE)

(73) Assignee: KNORR-BREMSE Systeme fuer Nutzsfahrzeuge GmbH, Munich (DE)

( * ) Notice: Subject to any disclaimer, the term of this patent is extended or adjusted under 35 U.S.C. 154(b) by 0 days.

(21) Appl. No.: 14/290,179

(22) Filed: May 29, 2014

(65) Prior Publication Data

US 2014/0262632 A1 Sep. 18, 2014

Related U.S. Application Data

(63) Continuation of application No. PCT/EP2012/073207, filed on Nov. 21, 2012.

(30) Foreign Application Priority Data

Nov. 30, 2011 (DE) .......................... 10 2011 119 768

(51) Int. Cl.

| | | |
|---|---|---|
| *F16D 65/40* | (2006.01) | |
| *F16D 65/18* | (2006.01) | |
| *F16D 65/56* | (2006.01) | |
| *F16D 121/14* | (2012.01) | |

(Continued)

(52) U.S. Cl.
CPC .............. *F16D 65/40* (2013.01); *F16D 65/183* (2013.01); *F16D 65/568* (2013.01); *F16D 2121/14* (2013.01); *F16D 2125/28* (2013.01); *F16D 2131/00* (2013.01)

(58) Field of Classification Search
CPC ........ F16D 65/40; F16D 65/56; F16D 65/567; F16D 65/568; F16D 2131/00
USPC ............... 188/71.7, 71.8, 71.9, 196 D, 196 V
See application file for complete search history.

(56) References Cited

U.S. PATENT DOCUMENTS

| | | | | |
|---|---|---|---|---|
| 3,873,018 | A * | 3/1975 | Donnay ......................... | 215/256 |
| 6,659,235 | B2 | 12/2003 | Örtegren et al. | |
| 6,668,981 | B2 * | 12/2003 | Ortegren et al. ............. | 188/71.8 |

(Continued)

FOREIGN PATENT DOCUMENTS

| | | |
|---|---|---|
| CN | 1326059 A | 12/2001 |
| CN | 1575384 A | 2/2005 |

(Continued)

OTHER PUBLICATIONS

International Preliminary Report on Patentability (PCT/IB/373) dated Sep. 2, 2014, including English translation of Written Opinion (PCT/ISA/237) (five (5) pages).

(Continued)

*Primary Examiner* — Thomas J Williams

(74) *Attorney, Agent, or Firm* — Crowell & Moring LLP

(57) ABSTRACT

A functional unit is provided for adjusting a brake pad of a disc brake, having the following function parts: a guide rail, two adjusting spindles, arranged parallel to and spaced apart from each other in the guide rail and held in an axially moveable manner, and a synchronization device for synchronously adjusting the adjusting spindles, wherein the functional parts are pre-mounted into one assembly.

6 Claims, 2 Drawing Sheets

(51) Int. Cl.
*F16D 125/28* (2012.01)
*F16D 131/00* (2012.01)

(56) References Cited

U.S. PATENT DOCUMENTS

| | | | |
|---|---|---|---|
| 8,469,160 B2 * | 6/2013 | Iraschko et al. | 188/71.9 |
| 2002/0017436 A1 | 2/2002 | Ortegren et al. | |
| 2005/0103583 A1 | 5/2005 | Baumgartner et al. | |
| 2006/0163011 A1 * | 7/2006 | Sandberg et al. | 188/72.1 |
| 2010/0230219 A1 | 9/2010 | Helf | |
| 2012/0073912 A1 | 3/2012 | Camilo-Martinez et al. | |
| 2014/0174862 A1 * | 6/2014 | Gruber et al. | 188/71.9 |
| 2014/0216863 A1 * | 8/2014 | Weber et al. | 188/71.9 |

FOREIGN PATENT DOCUMENTS

| | | |
|---|---|---|
| CN | 101802436 A | 8/2010 |
| DE | 103 07 657 A1 | 9/2004 |
| WO | WO 2010/121754 A1 | 10/2010 |

OTHER PUBLICATIONS

International Search Report dated Sep. 27, 2013 with English translation (five (5) pages).
German Office Action dated Aug. 5, 2014 (five (5) pages).
Chinese Office Action issued in corresponding Chinese Application No. 201280058968.9 dated Sep. 2, 2015 with English translation (eight pages).

* cited by examiner

FUNCTIONAL UNIT FOR ADJUSTING A BRAKE PAD OF A DISC BRAKE

CROSS REFERENCE TO RELATED APPLICATIONS

This application is a continuation of PCT International Application No. PCT/EP2012/073207, filed Nov. 21, 2012, which claims priority under 35 U.S.C. §119 from German Patent Application No. 10 2011 119 768.4, filed Nov. 30, 2011, the entire disclosures of which are herein expressly incorporated by reference.

BACKGROUND AND SUMMARY OF THE INVENTION

The invention relates to a functional unit for adjusting a brake pad of a disc brake such as a commercial vehicle disc brake.

The functional unit is arranged with its essential functional parts in the interior of a brake caliper. The brake force which is applied via a rotary brake lever is transmitted via the guide rail (bridge), against which the brake lever bears, to a brake pad which bears against the guide rail and can be pressed against a brake disc in the case of braking.

To this end, pressure pieces are assigned to the adjusting spindles on the sides which lie opposite the brake lever, for bearing against the brake pad.

In order to compensate for an air play which changes in a wear-induced manner between the brake pad and the brake disc, the adjusting spindles are moved in the direction of the brake disc, to which end a wear adjuster engages into one of the adjusting spindles, which are configured as a threaded tube. The wear adjuster rotates the adjusting spindle upon actuation of the brake lever.

In order to rotate both adjusting spindles homogeneously, a synchronizing device is provided which is arranged as a traction mechanism drive on both adjusting spindles such that it cannot rotate.

Here, the traction mechanism drive consists of two drive wheels, of which in each case one is held in a rotationally locked but axially displaceable manner on an associated adjusting spindle, whereas a traction mechanism, preferably a link chain, a toothed belt, a perforated belt or a string of beads, engages in a positively locking manner into an external toothing system of the drive wheels. The synchronization of the two adjusting spindles such that the connected brake pad runs with a continuously identical gap size with respect to the brake disc has taken place up to now after extensive assembly of the disc brake.

Problems arise, however, if components of the mechanism, which is positioned in the interior of the brake caliper, are damaged. In order to repair or replace them, the brake caliper has to be opened on its side which faces the brake disc, where it is sealed by way of a closure plate which is screwed to the brake caliper.

Here, passage openings of the closure plate for the adjusting spindles are closed in each case by a folding bellows which is held on one side on the adjusting spindle and on the other side on the closure plate. The folding bellows also have to be removed, just like the individual components of the functional unit of the generic type.

Since a replacement of the damaged parts is, in practice, impossible on account of the work-intensive dismantling and assembly, including the safety-relevant setting of the functional unit, in particular renewed synchronization of the adjusting spindles, the entire disc brake is usually replaced.

This naturally represents an extremely unsatisfactory state with regard to economics.

The invention is based on the object of developing a functional unit of the generic type in such a way that more economical operation of the disc brake is made possible, in particular by way of a reduction of repair costs.

This object is achieved by way of an apparatus for adjusting a brake pad of a disc brake, having the following functional parts: a guide rail, two adjusting spindles which are arranged parallel to and a spacing from one another in the guide rail and are held in an axially movable manner, and a synchronizing device for the synchronous adjustment of the adjusting spindles. The functional parts are preassembled to form a modular unit.

A whole series of advantages arise from the fact that, according to the invention, the functional unit, above all with the specific functional parts of the guide rail, the adjusting spindles which are arranged parallel to and at a spacing from one another and are held in a rotationally and axially movable manner in the guide rail, and the synchronizing device, are preassembled to form a modular unit.

The functional setting of the synchronizing device can thus be performed at the factory, which naturally simplifies the assembly of the functional unit substantially.

Here, the synchronizing device consists of the components which are defined in the introduction of the description, above all a traction mechanism drive which, according to a further concept of the invention, is arranged on the outlet side of the adjusting spindles from the guide rail. However, the arrangement of the traction mechanism drive on the opposite side of the guide rail, but inside the brake caliper, is also contemplated. In this traction mechanism drive, the drive wheels are configured in such a way that an axial adjustment of the adjusting spindles with respect to the traction mechanism drive is possible, and secondly the drive wheels are connected in a rotationally fixed manner on the adjusting spindles.

Secondly, the drive wheels are mounted in an axially secured manner in relation to the longitudinal axial direction of the adjusting spindle but such that they can be rotated on the guide rail.

In addition to simpler assembly the invention is also distinguished by the fact that other functional parts which are arranged in the brake caliper, for example other parts of the brake application device, can be removed and replaced without problem if required, namely in the case of a necessary replacement, since the preassembled module which is present as one functional unit in a structurally assembled manner can be removed from the brake caliper without problem, with the result that free access to the interior of the brake caliper is possible.

Subsequently, after replacement of the corresponding functional part, the module can be inserted again, either in a completely new state or merely the removed, functional module.

A further embodiment of the invention is to be considered particularly advantageous, in which the closure plate and the folding bellows are likewise taken into consideration as functional parts during the preassembly of the module.

The correct setting of the synchronizing device can be seen, for example, by the attachment of a tamper-proof marking, for example in the sense of a seal which, after setting at the factory, is preferably attached in the sealing region between two functional parts which can be moved relative to one another.

However, it is also contemplated to couple the preassembled closure plate and the guide rail to one another by a seal or a lead seal. In every case, it is ensured that a complete module in the original state is used.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
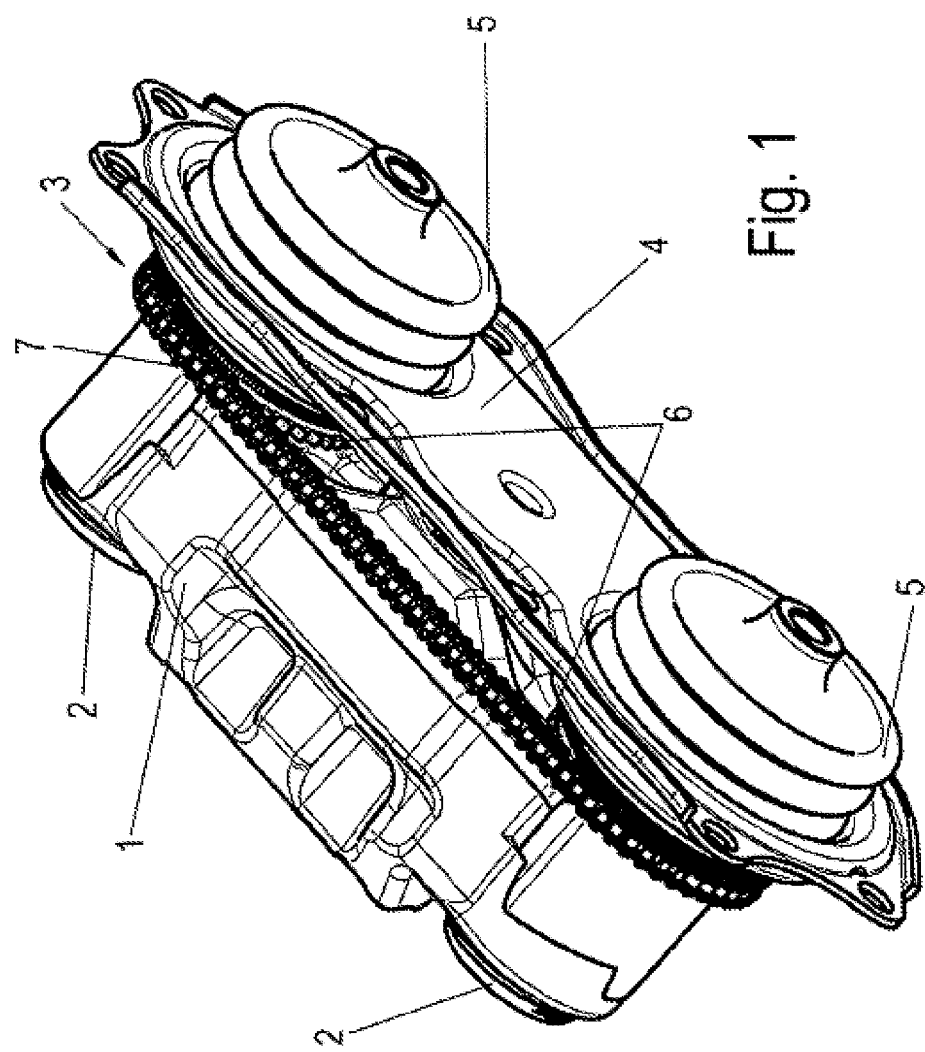
FIG. 1 shows an apparatus according to an embodiment of the invention, in which functional parts have been combined to form one modular unit, in a perspective view.
Figure 2:
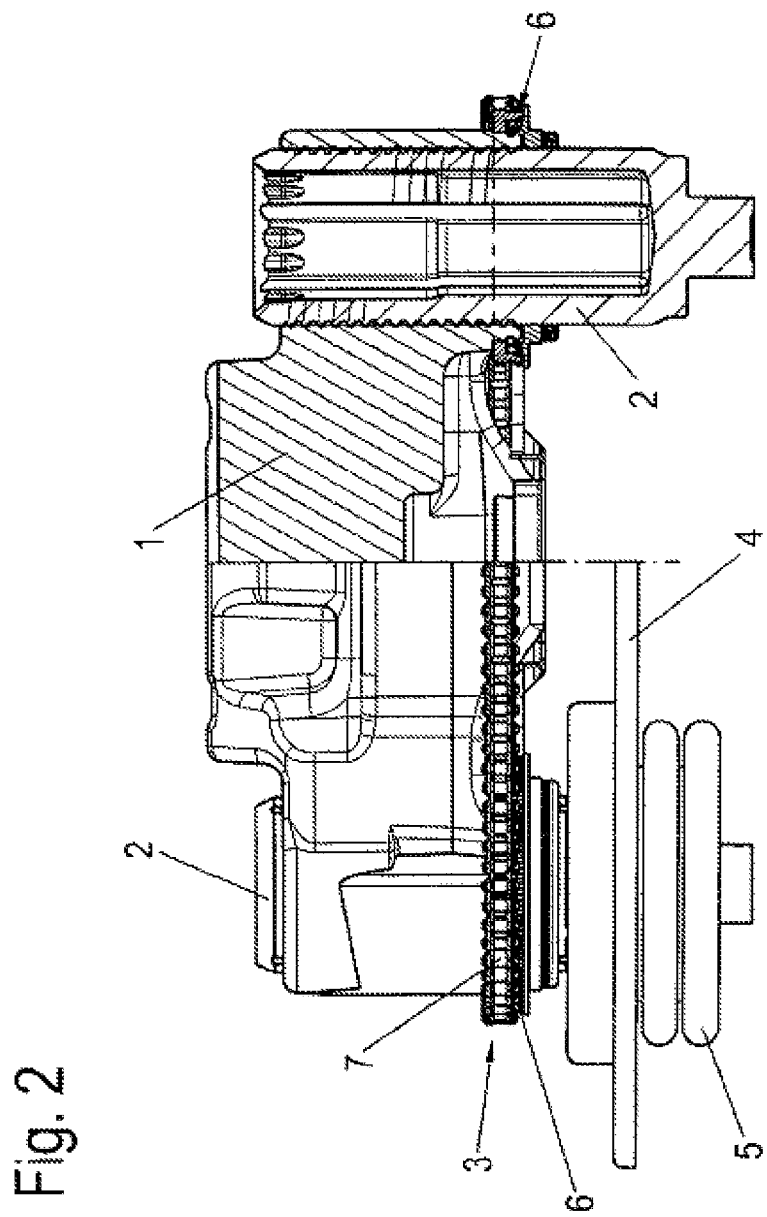
FIG. 2 shows a part of the module according to FIG. 1 as a half section in a plan view.

The figures show a functional unit for adjusting a brake pad of a disc brake. The functional unit includes the following functional parts: a guide rail (also known as a "bridge") 1, in which two adjusting spindles 2, which are arranged parallel to and at a spacing from one another, are held in an axially movable manner, and a synchronizing device 3 for the synchronous adjustment of the adjusting spindles 2.

A closure plate 4 is arranged at the free ends of the adjusting spindles 2 which protrude out of the guide rail 1 in the adjusting direction. The closure plate 4 can be screwed to a brake caliper (not shown) of the disc brake. By way of the closure plate 4 the interior of the brake caliper is sealed with respect to the surroundings environment.

Passage openings of the closure plate 4 in the region of the adjusting spindles 2 are closed in each case by a folding bellows 5 which is held on one side on the adjusting spindle 2 and on the other side on the closure plate 4.

The guide rail 1, the adjusting spindles 2 which are otherwise screwed as threaded tubes into the guide rail 1, the synchronizing device 3 and the closure plate 4 with connected folding bellows 5 are preassembled according to the invention to form a module.

The synchronizing device 3 is arranged in the guide rail 1 and is formed by a traction mechanism drive, consisting of two drive wheels 6, of which in each case one engages into one of the adjusting spindles 2, and a traction mechanism 7, a link chain in the example, which engages into a spur toothing system of the drive wheels 6.

Otherwise, a compression spring can also be positioned between the closure plate 4 and the guide rail 1, by way of which compression spring the guide rail 1 including adjusting spindles 2 which are arranged therein and the synchronizing device 3 can be pressed back into a starting position after release of the brake.

In addition, a tensioner can act on the traction mechanism 7 as a further functional part, by way of which tensioner the runs of the traction mechanism 7 can be tensioned.

LIST OF DESIGNATIONS

1. Guide rail (bridge)
2. Adjusting spindles
3. Synchronizing device
4. Closure plate
5. Folding bellows
6. Drive wheels
7. Traction mechanism The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for adjusting a brake pad of a disc brake, comprising:
    a guide rail;
    two adjusting spindles arranged parallel to and at a given distance from one other in the guide rail, the two adjusting spindles being held in an axially moveable manner; and
    a synchronizing device configured for synchronous adjustment of the adjusting spindles, wherein
        the guide rail, the two adjusting spindles, and the synchronizing device are functional parts preassembled into a modular unit,
        the two adjusting spindles are synchronized with one another during preassembly to form the modular unit,
        a tamper-proof marking is arranged in an adjoining region of two functional parts of the modular unit that are moveable relative to one another, and
        the synchronizing device includes a traction mechanism consisting of two drive wheels held in a rotationally locked but axially displaceable manner on an associated adjusting spindle, such that the traction mechanism engages in a positive relocking manner into an external toothing system of the two drive wheels.

2. The apparatus according to claim 1, wherein the modular unit further comprises a closure plate having, in each case, one folding bellows assigned to a respective adjusting spindle, the folding bellows sealing a passage opening in the closure plate through which the adjusting spindle protrudes.

3. The apparatus according to claim 1, wherein the tamper-proof marking is a seal.

4. The apparatus according to claim 1, wherein the traction mechanism is selected from the group consisting of a link chain, a toothed belt, and a string of beads.

5. The apparatus according to claim 2, wherein in the preassembled modular unit, the closure plate and the guide rail are coupled to one another by a seal.

6. The apparatus according to claim 2, wherein tamper-proof marking is arranged between the closure plate and the guide rail.

* * * * *